(12) United States Patent
Elgarat et al.

(10) Patent No.: US 10,223,245 B1
(45) Date of Patent: Mar. 5, 2019

(54) SYSTEM, METHOD, AND COMPUTER PROGRAM FOR IDENTIFYING TESTS TO AUTOMATE IN A SOFTWARE TESTING PROJECT

(71) Applicant: Amdocs Development Limited, Limassol (CY)

(72) Inventors: Sharon Elgarat, Kibbutz Mefalsim (IL); Ohad Mezner, Haifa (IL); Itsik David, Petach Tiqwa (IL); Erez Shacham, Givat Ela (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 38 days.

(21) Appl. No.: 15/599,235

(22) Filed: May 18, 2017

Related U.S. Application Data (60) Provisional application No. 62/342,813, filed on May 27, 2016.

(51) Int. Cl.
*G06F 11/36* (2006.01)

(52) U.S. Cl.
CPC .............................. *G06F 11/3672* (2013.01)

(58) Field of Classification Search
None
See application file for complete search history.

(56) References Cited

U.S. PATENT DOCUMENTS

| | | | | |
|---|---|---|---|---|
| 7,039,902 B2* | 5/2006 | Kuzmin | ............... | G06F 11/3676 714/E11.207 |
| 7,444,271 B2* | 10/2008 | Craske | ............ | G01R 31/318307 703/2 |
| 8,266,592 B2* | 9/2012 | Beto | ................... | G06F 11/3688 717/124 |
| 8,819,633 B2* | 8/2014 | Rossi | .................. | G06F 11/3688 717/124 |
| 9,058,428 B1* | 6/2015 | Siddiqui | ................. | G06F 11/34 |
| 2015/0309918 A1* | 10/2015 | Raghavan | ........... | G06F 11/3688 714/38.1 |

FOREIGN PATENT DOCUMENTS

| | | |
|---|---|---|
| CA | 2469949 A1 | 7/2003 |
| CN | 103605612 A | 2/2014 |
| CN | 104598380 A | 5/2015 |
| GB | 2397905 B | 4/2005 |
| WO | 2007137082 A3 | 10/2008 |
| WO | 2013165367 A8 | 9/2014 |

OTHER PUBLICATIONS

Anonymous, "Self-Refactored Automation System for Software UI Automation Testing", Feb. 12, 2014 IP, IP.com No. IPCOM000234875D (Year: 2012).*

* cited by examiner

*Primary Examiner* — Hossain M Morshed
(74) *Attorney, Agent, or Firm* — Zilka-Kotab, P.C.

(57) ABSTRACT

A system, method, and computer program product are provided for identifying tests to automate in a software testing project. In operation, a request for a recommendation for at least one test to automate in a software testing project including a plurality of tests is received. Additionally, a plurality of parameters associated with the software testing project are identified to identify the at least one test to automate. Further, the at least one test to automate is identified from the plurality of tests associated with the software testing project, based on the plurality of parameters. Moreover, the at least one test to automate is presented as the recommendation utilizing at least one user interface.

4 Claims, 6 Drawing Sheets

SYSTEM, METHOD, AND COMPUTER PROGRAM FOR IDENTIFYING TESTS TO AUTOMATE IN A SOFTWARE TESTING PROJECT

CLAIM OF PRIORITY

This application claims the benefit of U.S. Provisional Application No. 62/342,813, filed May 27, 2016, the entire contents of which are incorporated herein by reference.

FIELD OF THE INVENTION

The present invention relates to software testing, and more particularly to efficiently maximizing test automation in software testing projects.

BACKGROUND

A variety of systems are used to present a test design to a tester assigned to execute a scope within a testing project. The user may navigate in the system to understand the assigned testing scope. An order may be set between the tests presented in the system. The order of tests may represent an arbitrary sequence, a rate of importance for a business, or any other predefined logic applied by the test designer while planning the tests that are included in the testing scope within the testing project.

The tests may be grouped into flows with an internal order or presented as standalone actions. The grouped flows may represent added business value, technical system scenarios that must be followed to reach the next test in the flow, or any other predefined logic applied while grouping the tests into a specific flow. Tests within the designed scope may include parameters that contain multiple options and may impact the expected behavior of the tested functionality and therefore represent a different permutation of the tested action.

A testing scope may include multiple repetitions of the same generic parameterized test, and the same permutation of the parameterized test may repeat multiple times within a testing project. The repetition may also appear in common elements within tests using the same permutation of values for some of the test steps within the test case but without common values for all parameters in the complete test. Specific tests or specific flows within the testing project may have a higher importance than others to the business. Specific tests or specific flows within the testing project may have a higher probability to detect errors in the software being tested.

A variety of automation platforms may be used to store and execute automated testing scripts. The automated testing scripts may be linked to the designed test cases using a variety of techniques allowing the user working in the design system to know if a specific activity or an element within the activity (test step) is automated or not. An example of such a technique is to link the automated scripts to the activities and allow the design platform access to a shared repository of activity permutation steps for which an indication is available to indicate if the activity permutation step is automated.

By working with design and automation platforms linked, a user may be able to identify activities that are automated and activities that are not automated, but the user still needs to know where to invest effort to increase the acceleration of automation rate in the quickest way. Simply following the order of tests defined in the design and automating based on that order may cause the tester to automate many activity permutations that were unique for that test only and do not return in other tests, so the ramp-up of automation would be very low.

There is thus a need for addressing these and/or other issues associated with the prior art.

SUMMARY

A system, method, and computer program product are provided for identifying tests to automate in a software testing project. In operation, a request for a recommendation for at least one test to automate in a software testing project including a plurality of tests is received. Additionally, a plurality of parameters associated with the software testing project are identified to identify the at least one test to automate. Further, the at least one test to automate is identified from the plurality of tests associated with the software testing project, based on the plurality of parameters. Moreover, the at least one test to automate is presented as the recommendation utilizing at least one user interface.

DETAILED DESCRIPTION

Figure 1:
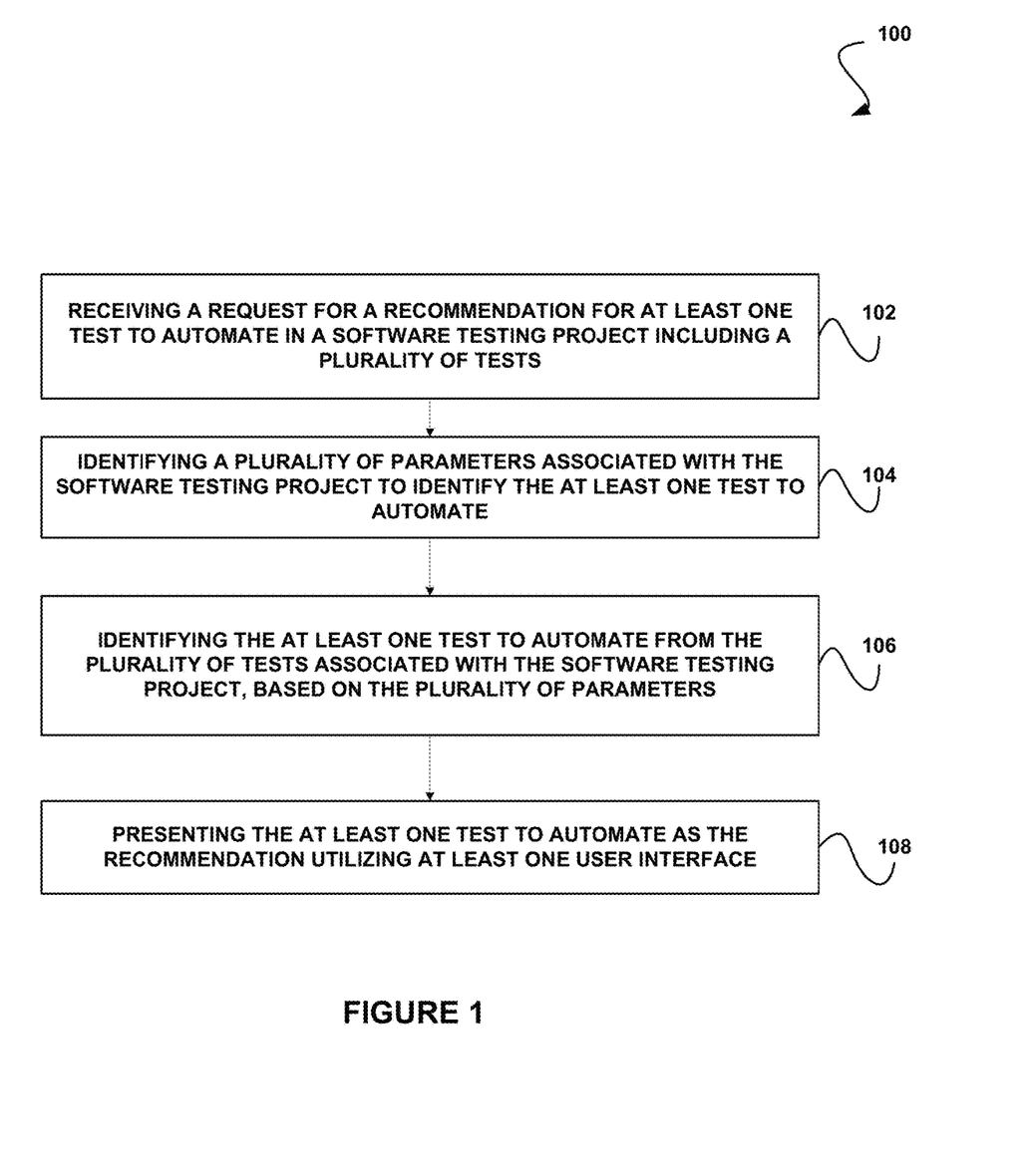
FIG. 1 illustrates a method for identifying tests to automate in a software testing project, in accordance with one embodiment.

FIG. 1 illustrates a method 100 for identifying tests to automate in a software testing project, in accordance with one embodiment.

As shown, a test design system receives a request for a recommendation for at least one test to automate in a software testing project including a plurality of tests. See operation 102. The software testing project may be associated with the testing of any application and/or software and/or portion thereof.

Additionally, the test design system identifies a plurality of parameters associated with the software testing project to identify the test to automate. See operation 104. The parameters may include any parameter that may impact the identification of the test to automate, such as a risk level indication for defects, customization level indication of the tested software, business centricity of the parameter permutations tested and test length, etc.

Further, the test design system identifies the test to automate from the plurality of tests associated with the software testing project, based on the plurality of parameters. See operation 106.

Moreover, the test design system presents the at least one test to automate as the recommendation utilizing at least one user interface. See operation 108.

In one embodiment, the test design system may reorder a plurality of tests associated with the software testing project based on an identified contribution to automation reuse ramp-up corresponding to each of the plurality of tests. The test design system may also prioritize a plurality of tests associated with the software testing project based on a balanced combination of project, customer, and quality parameters with an automation reuse ramp-up contribution parameter.

Still yet, in one embodiment, the test design system may generate a recommendation of ordered tests to provide to test executers as a single list for on-the-fly automation for maximal ramp-up of automation reuse. Additionally, the test design system may generate a recommendation of ordered tests to provide to test designers as a single list for final test design and pre-execution automation activities for maximal ramp-up of automation reuse.

The method 100 may be implemented by the test design system to calculate a software testing flow permutation that a manual tester should execute and convert to automation to contribute the highest rate of automation ramp-up to the testing project. Working with any automation platform that supports partially automated test execution, the tester strives to invest minimal effort in automating tests while receiving the maximum number of required tests to be performed by the testing automation system.

Thus, the method 100 may be implemented as an algorithm by a test design platform/system to identify and present the next test within the scope of tests left to execute within a testing project, which the tester should invest in converting to automated tests to contribute to the highest value in testing automation ramp-up for the testing project.

The test design system may consider multiple parameters in the calculation of the recommended tests to automate. Additionally, the test design system may be set to identify single tests or full end-to-end business flows (e.g. multiple tests, etc.). The system may present the results of its calculation on a user interface associated with the test design platform to allow the tester to clearly recognize the identified tests and their contribution to the ramp-up in automation for the testing project.

It should be noted that the method 100 may be implemented utilizing various systems, hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

A variety of automation platforms may be used to store and execute automated testing scripts. The automated testing scripts may be linked to the designed test cases using a variety of techniques allowing a user working in the design system to determine if a specific activity or an element within the activity (i.e. a test step) is automated. An example of such a technique is to link the automated scripts to the activities and allow the design platform access to a shared repository of activity permutation steps for which an indication is available to indicate if the activity permutation step is automated or not.

By working with design and automation platforms linked, a user may be able to identify activities that are automated and activities that are not automated, but the user still needs to know where to invest effort to increase the rate of automation rate in the quickest way. Simply following the order of tests defined in the design and automating based on that order may cause the tester to automate many activity permutations that were unique for that test and do not return in other tests, so the ramp-up of automation would be very low.

The test design system described herein presents a user with an optimal order of tests to automate, to maximize the ramp-up of automation. The test design system focuses on reordering a given set of tests and may apply to any set of tests, selected by any selection algorithm or even a pure manual selection by human. In one embodiment, the test design system may determine the order needed to achieve faster automation ramp-up in order to increase efficiency of the testing effort during test execution and shorten the time it takes to run a large scope of testing.

The test design system holding the test design may include functions to allow users to request a recommendation for tests to automate from a sub set of the designed scope, defining both the sub set for recommendation and the overall scope to consider as impacted reuse of the automation achieved.

In another embodiment, the test design system may allow a function placed on the system holding automated tests to allow users to request a recommendation for tests to automate based on all predefined tests located in the testing repository or a sub set defined by the user. A fully automatic solution for the recommendation request may be triggered by the test design system holding the test design as means to trigger alerts for test designers who introduced new sets of tests which require translation to automated tests.

An additional fully automatic solution may be implemented in the test design system holding the automated tests, triggering the recommendation process automatically for any new sets of tests uploaded from the repository where not all tests are identified as fully automated at the upload activity.

In one embodiment, the test design system may utilize/accept an optional parameter that may influence the recommendation for automation, which is the rate of repetition of the action performed in the non-automated tests. Tests that contain actions that repeat in multiple other tests within the selected scope for recommendation allow higher automation rate ramp up as reuse of the automated building block is available for all other tests which contain the identical action.

Additional optional parameters which may influence the recommendation for automation are any parameters that influence the priority of the individual test for test execution, such as business priority for the value the function tested provides to the end customer, customization level of the tested function, risk level as analyzed from previous instability of the tested function, etc.

Mid process calculated parameters that may influence the recommendation include any parameter the test design system calculates from the provided inputs as means to enrich the considerations or build mid-level aggregates needed for the algorithm balancing all considerations to a final grade to produce a final recommended order of tests to automate.

In one embodiment, the test design system may implement an algorithm for identifying the order of tests to automate that includes weighted decision making functions, attributing a weight to each test in the scope of tests for recommendation, based on the value it received in each parameter and the weights template defined between parameters and parameter values. Once a weighted grade is attributed to each test a top to down order may be presented as the recommendation for automation. The holistic algorithm enables a top down recommendation focusing tests based on long term goals.

In another embodiment, the test design system may implement a user interface allowing the user to determine dynamically the importance level of parameters and receive a recommendation based on the tests that score the highest on the selected parameters only, ignoring other considerations. The dynamic algorithm enables different stages of the project to focus on the priority set at that stage and refocus once the project advances to its next stage.

An optional user interface to present the recommendation may be embedded within the test design system. The test designer who requested a recommendation may receive the list of recommended tests from the test design system and the test design system may automatically reorder the tests in the design based on the recommendation such that when executing, the testers performing test execution may focus on test recommended for automation.

An additional optional user interface to present the recommendation may be embedded within the test design system which holds the automated tests. The recommended order may be presented to allow the user to select the next test to automate.

A user interface option which supports an automatic process may be displayed as an alerting system, by any means of alert (e.g. email, browser alerts, SMS, etc.) informing the user of the recommendation made by the test design system and allowing direct connection to the test design system to automate and/or reorder the design based on the recommendation.

Figure 2:
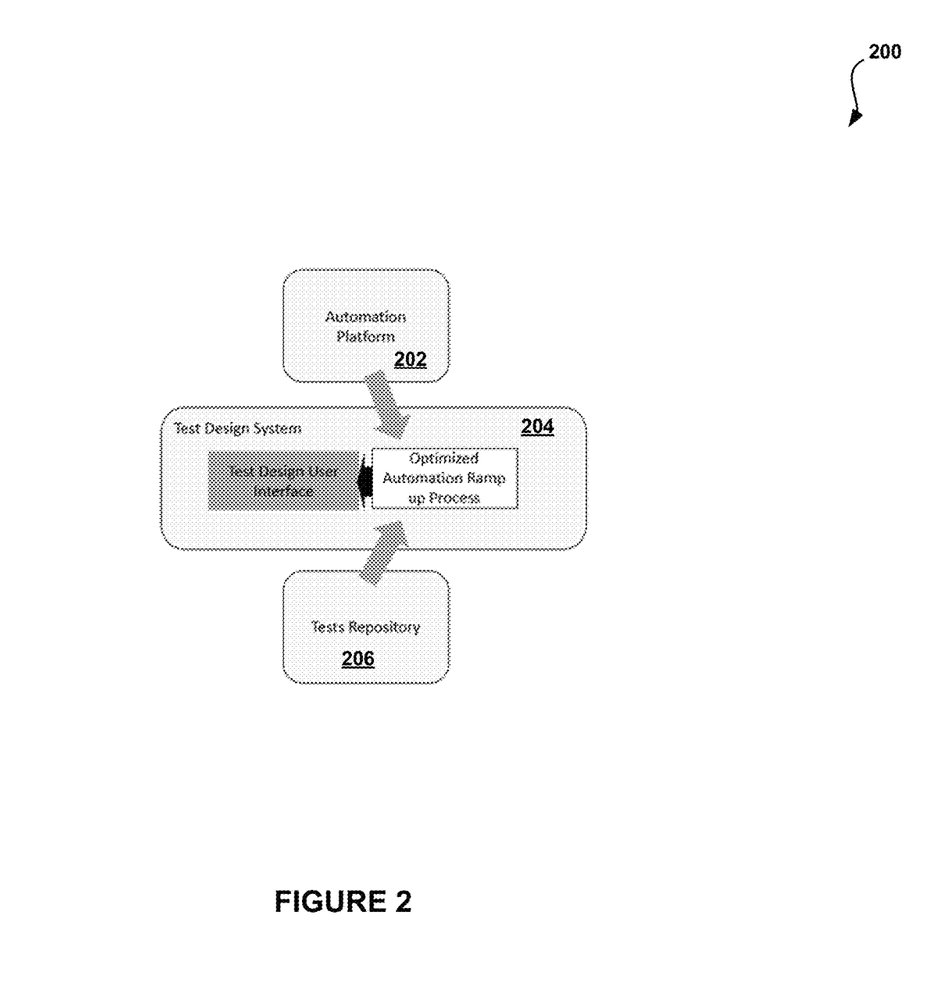
FIG. 2 shows a system architecture for identifying tests to automate in a software testing project, in accordance with one embodiment.

FIG. 2 shows a system architecture 200 for identifying tests to automate in a software testing project, in accordance with one embodiment. As an option, the architecture 200 may be implemented in the context of the details of FIG. 1 and/or any subsequent figure(s). Of course, however, the architecture 200 may be implemented in the context of any desired environment. Further, the aforementioned definitions may equally apply to the description below.

As shown, the system architecture 200 includes an automation platform 202, a test design system 204, and a tests repository 206.

The system holding the tests repository 206 may hold a large number of tests related to a specific testing project. In addition, the tests repository 206 may hold a large number of tests that are not related to the testing project.

From the test design system 204, the user may define a group of designated tests as being related to a specific scope of work that is about to move into execution and that will also require execution to complete at the same milestone(s). The definition can be made, for example, by attributes on the TCs, organizing the tests under a common tree of directories or by selecting groups of test scenarios.

The definition of the testing project scope allows the test design system 204 to define boundaries for calculation. The optimized automation ramp-up calculation will only consider tests from the defined project scope. This is set to ensure the ramp-up achieved contributes to the scope of work that the testers are aiming to achieve within the current time and budget.

Figure 3:
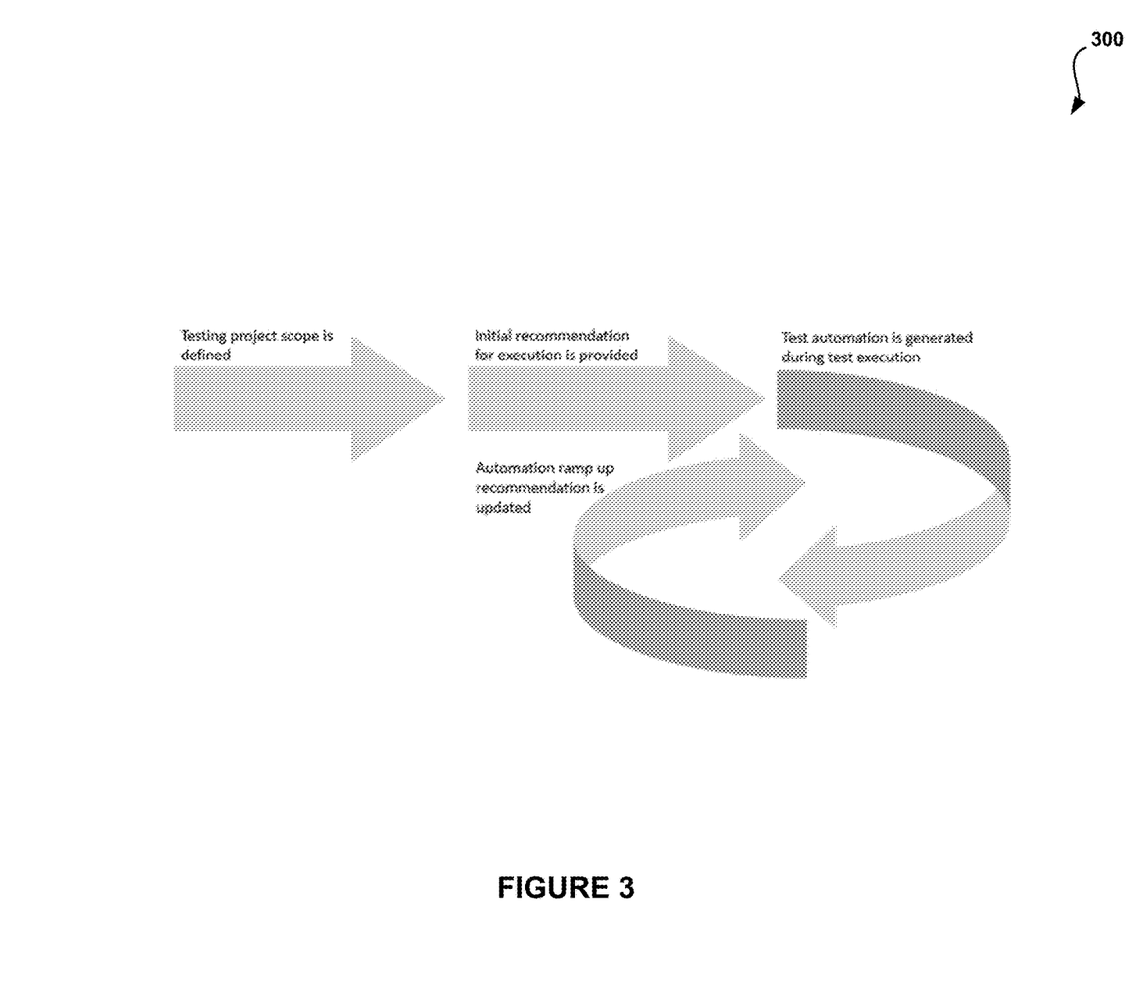
FIG. 3 shows a system workflow for identifying tests to automate in a software testing project, in accordance with one embodiment.

FIG. 3 shows a system workflow 300 for identifying tests to automate in a software testing project, in accordance with one embodiment. As an option, the system workflow 300 may be implemented in the context of the details of the previous figures and/or any subsequent figure(s). Of course, however, the system workflow 300 may be implemented in the context of any desired environment. Further, the aforementioned definitions may equally apply to the description below.

As show, a testing project scope is defined utilizing a test design system. The test design system generates an initial recommendation for execution. The test design system generates the test automation during execution. Further, the test design system updates the automation ramp-up recommendation.

Figure 4:
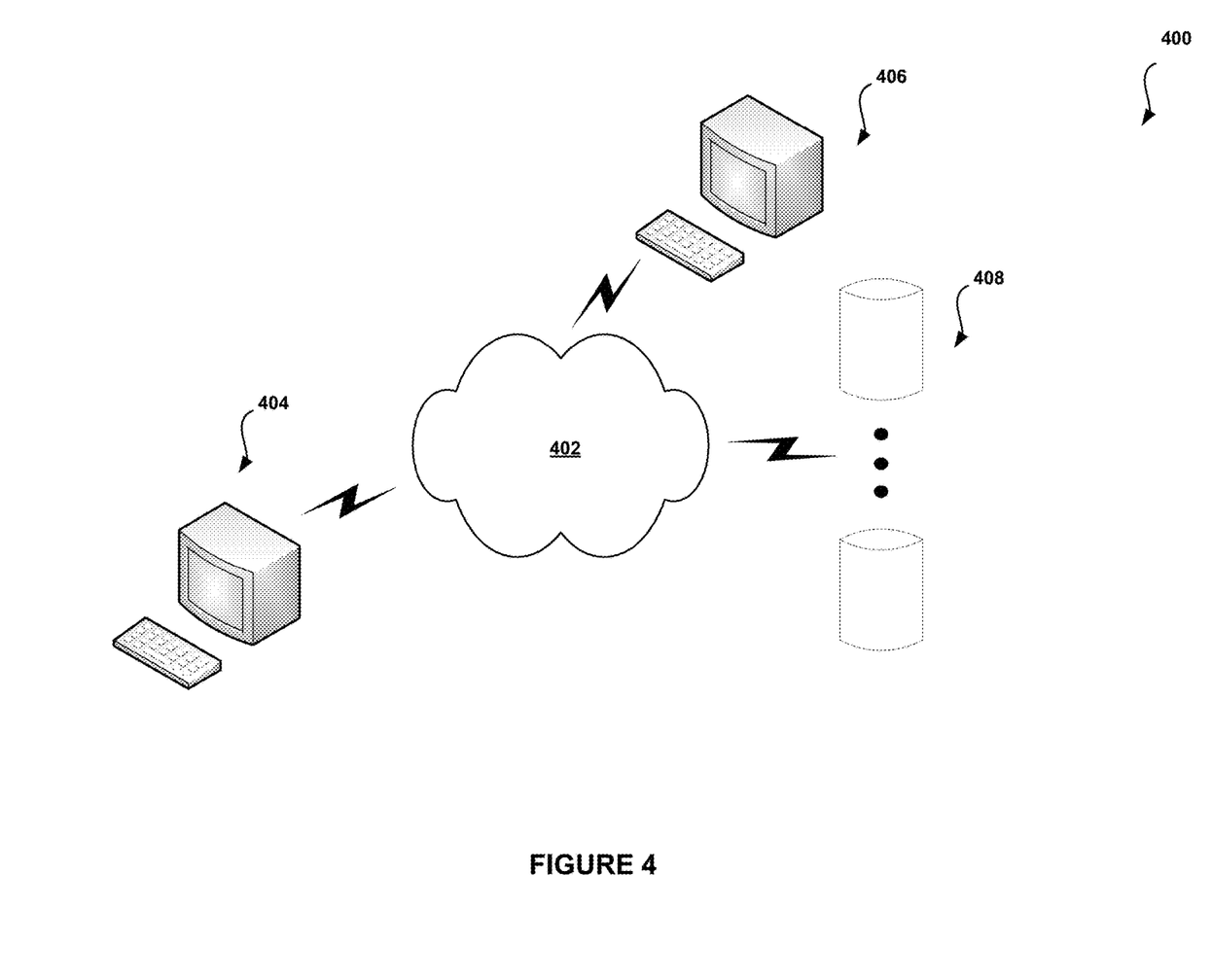
FIG. 4 shows a system for identifying tests to automate in a software testing project, in accordance with one embodiment.

FIG. 4 shows a system 400 for identifying tests to automate in a software testing project, in accordance with one embodiment. As an option, the system 400 may be implemented in the context of the details of the previous figures and/or any subsequent figure(s). Of course, however, the system 400 may be implemented in the context of any desired environment. Further, the aforementioned definitions may equally apply to the description below.

As shown, the system 400 includes a test design system 404 that is in communication with a system under test 406, either directly, or over one or more networks 402. The test design system 404 is also in communication with one or more test repositories 408.

In operation, using a graphical user interface associated with the test design system 404, the user requests a recommendation for the defined testing project. An algorithm implemented by the test design system 404 causes the system to perform the following steps to provide the initial recommendation: 1) the test design system 404 provides the user the option to select between different parameters that should impact the recommendation (examples of parameters may include risk level for defects, customization level of the tested software, business centricity of the parameter permutations tested and test length, etc.); 2) the test design system 404 retrieves the percentage of automation of each test in the scope; 3) the test design system 404 retrieves the execution status of each test in the scope; 4) the test design system 404 provides the user the option to select whether to run only new tests (that have not already been executed) or also rerun already executed tests (the test design system 404 may also allow a user to select whether to rerun all or only tests that did not end successfully); 5) the test design system 404 excludes from the calculation scenarios that do not fit the user's selected option; 6) the test design system 404 calculates weights of each test scenario; 7) the test design system 404 orders the scenarios according to the descending weight; 8) test design system 404 presents the order to the user using a user interface including details such as automation percentage and parameter grades for the selected parameters; 9) the test design system 404 allows the user to select scenarios from the list to run and the user may follow or ignore the recommended order and skip scenarios; and 10) the tests are loaded into the automation platform to run according to the selected order.

With respect to step six and weight calculation, one example of the criteria/logic the test design system 404 may follow includes: a) maximum weight to fully automated scenarios (all TCs have 100% automation); b) higher weight for scenarios that start with fully automated tests; c) higher weight for scenarios in which the first manual test has a high repetition amount for all parameter values selected in the test for partially automated or manual tests in the testing project; d) higher weight for scenarios in which the entire scenario includes the highest amount of repetitions of all parameter values selected in the test for partially automated or manual test cases in the testing scope; and e) higher weight when the scenario grade in the selected parameters is higher.

Utilizing the test design system 404, while executing, the testers may automate the tests that were not fully automated previously. Any automated test generated by any user may be loaded to the automation repository of tests 408. Tests may be uploaded only if they were successfully executed and successfully translated to automation. Additional tests performed by testers working on other testing projects may also impact the ramp-up of automation as all projects update the same automation repository.

With respect to automation ramp-up recommendations updates, a user may go back to the design platform to receive new recommendations for different reasons. Examples of those reasons include, for example, completion of a last selected group, all selected tests are blocked or failed on open defects, or a user automated a scenario and would like to see the impact, etc.

Once complete, the test design system 404 will run the algorithm again, allowing the user again to select options at the same places, this time setting the last selected options as defaults. Upon completion, the test design system 404 will present the new recommendation to the user in an updated scenarios list ordered according to the recommended order.

Thus, the test design system 404 offers functionality including: ordering tests according to the value they have to achieve maximum use of automation, thus increasing efficiency of the effort during execution and reducing test execution time that is on the project's critical path; ordering tests utilizing a standalone algorithm that is not part of the selection algorithm, thus increasing the compatibility to Agile projects with large amounts of changes that require re-planning the order of tests to execute, thus increasing efficiency in case of defects; and generating ordering recommendations on a subset of the total tests planned and not necessarily on all tests in the project, thus allowing compliance with Agile projects that demand to work with multiple partial test cycles.

Existing systems in the domain of test calculation focus mainly on determining tests that should be designed as part of the project. However, these systems fail to consider the order in which tests should be executed to maximize the conversion of tests from manual to automation. These systems also do not include an algorithm to optimize the ramp-up of automation by adjusting the order of recommended scenarios based on the tests that will bring the highest automation ramp up rate in the project.

A random or arbitrary selection of tests for execution, while automating any manual test encountered will eventually produce a one hundred percent automation rate. However, the techniques and systems described herein ensure a user will receive the highest automation rate increase with each test converted from manual to automation for a testing project.

This functionality will dramatically increase the rate of automation as it encourages the user to automate, showing the user the benefits of each test the user has invested time in translating to automation. Without this ability, the users might skip the effort of converting tests to automation because in many cases the tests they automated were unique and therefore do not increase the automation rate of the project beyond the test that was already completed. Using the algorithm discussed herein, the system will calculate the most recommended tests to automate, so the largest possible amount of tests that still need to be executed will be impacted and the automation rate for them will increase.

Figure 5:
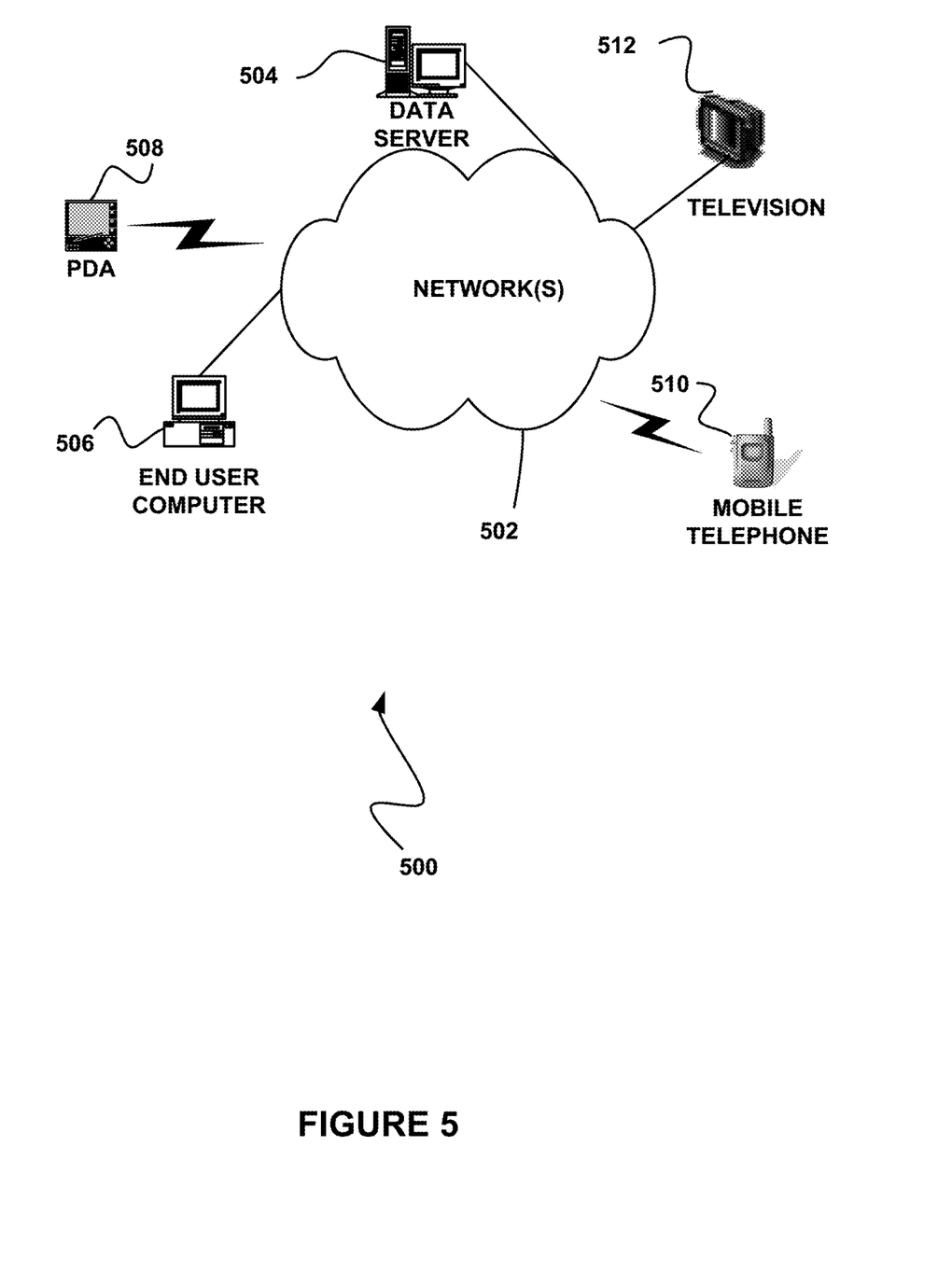
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
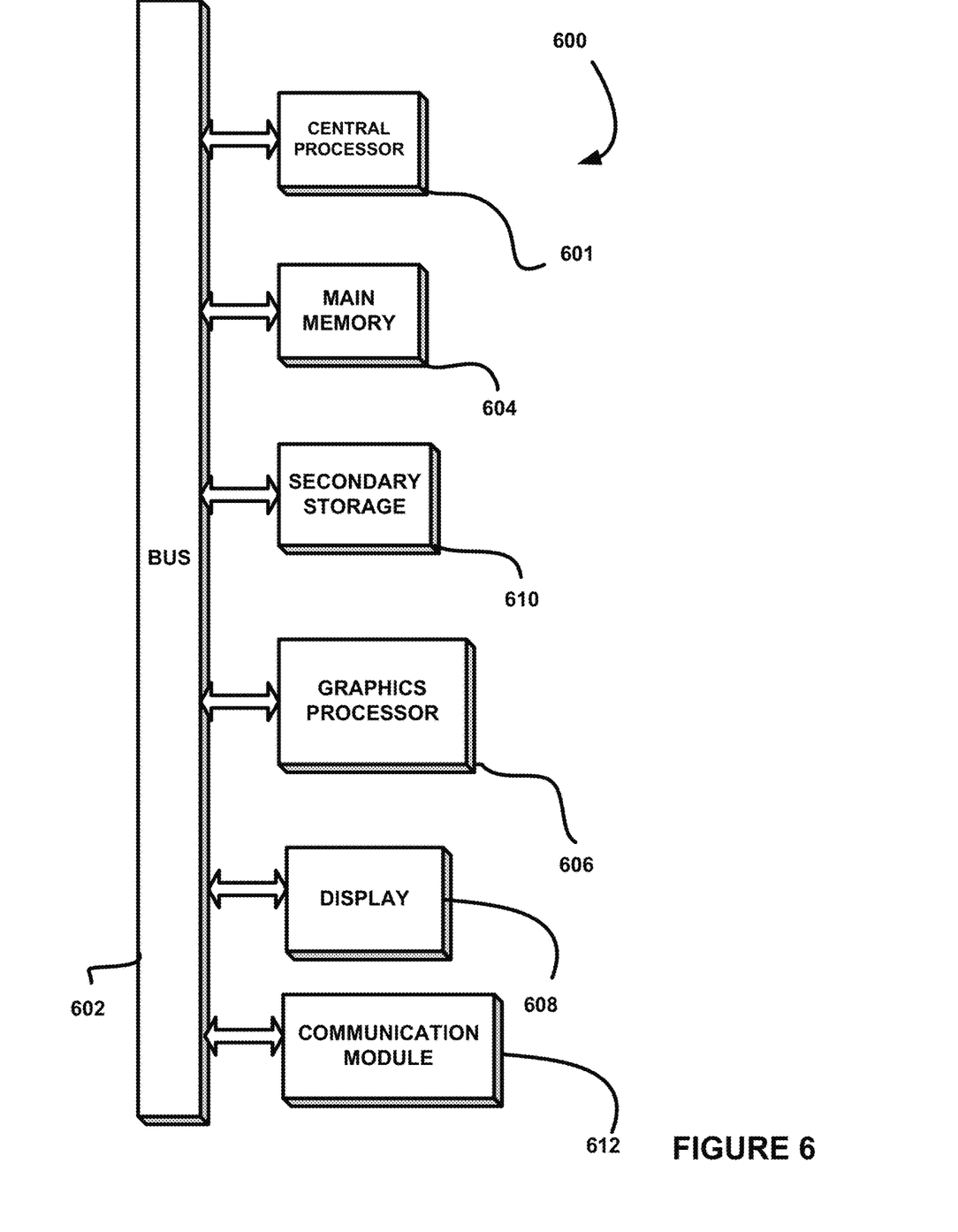
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means)

defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a test design system in association with a software testing project including a plurality of manual tests, a request for a recommendation indicating which manual tests of the plurality of manual tests to automate;
identifying, by the test design system responsive to the request, a plurality of parameters associated with each of the plurality of manual tests, including:
a rate of repetition that an action in the manual test is performed in one or mom multiple other manual tests of the plurality of manual tests, and
a business priority for a function tested by the manual test;
selecting, by the test design system, at least one manual test from the plurality of manual tests to automate, based on the plurality of parameters, the selected at least one manual test including:
at least one action that is repeated in the multiple other manual tests of the plurality of manual tests;
presenting, by the test design system, the selected at least one manual test as the recommendation indicating which manual tests of the plurality of manual tests to automate;
automating, by the test design system, the selected at least one manual test to generate an automated test, based on the recommendation; and during execution of the software testing project, reusing a portion of the automated test that includes the at least one action, for the multiple other manual tests of the plurality of manual tests.

2. The method of claim 1, wherein the plurality of parameters are selected from available parameters, by a user via a graphical user interface, to influence which manual tests of the plurality of manual tests are selected for automation.

3. A computer program product embodied on a non-transitory computer readable medium, comprising computer code for:

receiving, by a test design system in association with a software testing project including a plurality of manual tests, a request for a recommendation indicating which manual tests of the plurality of manual tests to automate;

identifying, by the test design system responsive to the request, a plurality of parameters associated with each of the plurality of manual tests, including:

a rate of repetition that an action in the manual test is performed in multiple other manual tests of the plurality of manual tests, and a business priority for a function tested by the manual test;

selecting, by the test design system, the at least one manual test from the plurality of manual tests to automate, based on the plurality of parameters, the selected at least one manual test including:

at least one action that is repeated in the multiple other manual tests of the plurality of manual tests;

presenting, by the test design system, the selected at least one manual test to as the recommendation indicating which manual tests of the plurality of manual tests to automate;

automating, by the test design system, the selected at least one manual test to generate an automated test, based on the recommendation; and during execution of the software testing project, reusing a portion of the automated test that includes the at least one action, for the multiple other manual tests of the plurality of manual tests.

4. A test design system comprising one or more processors operable for;

receiving, by the test design system in association with a software testing project including a plurality of manual tests, a request for a recommendation indicating which manual tests of the plurality of manual tests to automate;

identifying, by the test design system responsive to the request, a plurality of parameters associated with each of the plurality of manual tests, including:

a rate of repetition that an action in the manual test is performed in multiple other manual tests of the plurality of manual tests, and a business priority for a function tested by the manual test;

selecting, by the test design system, at least one manual test from the plurality of manual tests to automate, based on the plurality of parameters, the selected at least one manual test including:

at least one action that is repeated in the multiple other manual tests of the plurality of manual tests;

presenting, by the test design system, the selected at least one manual test to as the recommendation indicating which manual tests of the plurality of manual tests to automate;

automating, by the test design system, the selected at least one manual test to generate an automated test, based on the recommendation; and during execution of the software testing project, reusing a portion of the automated test that includes the at least one action, for the multiple other manual tests of the plurality of manual tests.

* * * * *